(12) United States Patent
Yokoo et al.

(10) Patent No.: US 7,824,724 B2
(45) Date of Patent: Nov. 2, 2010

(54) MILK-ADDED COFFEE BEVERAGE WITH BASIC AMINO ACIDS

(75) Inventors: Yoshiaki Yokoo, Osaka (JP); Katsushi Shibuya, Kyoto (JP); Yoshiko Hino, Osaka (JP); Tatsuji Onishi, Osaka (JP); Katsushi Murakami, Osaka (JP)

(73) Assignee: Suntory Holdings Limited, Osaka (JP)

( * ) Notice: Subject to any disclaimer, the term of this patent is extended or adjusted under 35 U.S.C. 154(b) by 43 days.

(21) Appl. No.: 11/984,846

(22) Filed: Nov. 21, 2007

(65) Prior Publication Data

US 2008/0081100 A1 Apr. 3, 2008

Related U.S. Application Data

(62) Division of application No. 10/021,434, filed on Dec. 19, 2001, now Pat. No. 7,318,942.

(30) Foreign Application Priority Data

Dec. 22, 2000 (JP) .............................. 2000-390632

(51) Int. Cl.
A23F 5/00 (2006.01)
(52) U.S. Cl. ...................... 426/580; 426/330.3; 426/594
(58) Field of Classification Search .................. 426/594, 426/330.3
See application file for complete search history.

(56) References Cited

U.S. PATENT DOCUMENTS 2,503,866 A 4/1950 Chrysler et al.
3,457,083 A * 7/1969 Kawai et al. ................. 426/534
5,993,877 A 11/1999 Ohtake
6,056,989 A 5/2000 Sasagawa et al.
7,318,942 B2 * 1/2008 Yokoo et al. ................. 426/594

FOREIGN PATENT DOCUMENTS

| DE | 3726487 | 12/1987 |
|---|---|---|
| JP | 43-15793 | 7/1943 |
| JP | 58-9652 | 1/1983 |
| JP | 61-124344 | 6/1986 |
| JP | 7-184546 | 7/1995 |
| JP | 8-228686 | 9/1996 |
| JP | 10-75712 | 3/1998 |
| JP | 11-9190 | 1/1999 |
| JP | 11-313647 | 11/1999 |

OTHER PUBLICATIONS

"Canned Beverages", Food Production/Distribution Data Handbook; Japan Industry Research Institute Publication Center, p. 720, 2000.

* cited by examiner

*Primary Examiner*—Anthony Weier
(74) *Attorney, Agent, or Firm*—Nixon & Vanderhye P.C.

(57) ABSTRACT

An economical process for producing a milk-added coffee beverage with an enhanced flavor in a process for producing a milk-added coffee beverage produced through a step of heat sterilization of coffee and milk as the main raw materials. The process includes adding a strongly basic substance and/or basic amino acid to the coffee component and conducting the heat sterilization after the milk component is admixed to the coffee component. Coagulation at the step of admixing milk component is prevented and precipitation which tends to arise after the heat sterilization is prevented with the use of a much smaller amount of emulsifier and thickening agent.

19 Claims, 2 Drawing Sheets

MILK-ADDED COFFEE BEVERAGE WITH BASIC AMINO ACIDS

CROSS-REFERENCE TO RELATED APPLICATION

This application is a divisional of application Ser. No. 10/021,434 filed Dec. 19, 2001, now U.S. Pat. No. 7,318,942, which in turn claims priority of Japanese application Serial No. 2000-390632 filed Dec. 22, 2000, the entire content of which is hereby incorporated by reference in this application.

BACKGROUND OF THE INVENTION

The present invention relates to a milk-added coffee beverage produced through a step of heat sterilization using coffee and milk component as the raw materials, and to a process for producing it. More specifically, it relates to a stable and rich-flavored milk-added coffee beverage in which precipitation that occurs after heat sterilization treatment is prevented, and to a process for producing it.

A wide variety of milk-added coffee beverage products (hereunder referred to as "milk-added coffee beverages") are known that are produced through a step of heat sterilization using coffee and milk components as the raw materials, and when classified according to the type of container these include canned beverages, PET bottled beverages, cardboard packed beverages and the like.

The common production steps for milk-added coffee beverages, in the case of canned milk-added coffee beverages for example, are "roasting", "grinding", "extraction", "formulation", "filtration", "filling", "rolling", "sterilization", "refrigeration" and "case packing".

The "formulation" step is a critical step in terms of the quality of product in the milk-added coffee beverage production process. Specifically, when milk is directly added to coffee extract, the acidic pH of the coffee extract causes the milk to coagulate. It has been common in the past to add sodium bicarbonate to milk-added coffee beverages in order to prevent milk coagulation. Sodium bicarbonate is used because it is colorless and odorless, and has little effect on flavor.

The "sterilization" step is also a critical step in terms of the quality of product in the milk-added coffee beverage production process. In the sterilization step, heat sterilization is usually carried out for 20 minutes in a 250 g can at 125° C. ("Food Production/Distribution Data Handbook", Japan Industry Research Institute Publication Center, p. 720). However, milk-added coffee beverages tend to produce precipitation after heat sterilization, and although such precipitation poses no problem whatsoever in terms of the safety of the product, it considerably impairs the product value.

Adjustment in the amount of sodium bicarbonate added has been a common means used to prevent these problems, but this alone does not provide a sufficient anti-precipitation effect, and therefore addition of an emulsifier or thickening agent (stabilizer, thickener, etc.) has been necessary. However, while addition of an emulsifier or thickening agent provides an anti-precipitation effect, it is sometimes undesirable from the standpoint of the flavor of the milk-added coffee beverage, and has also raised the product cost. In addition, since a greater amount of coffee and milk components tends to result in easier precipitation after heat sterilization, it is necessary to increase the amount of emulsifier or thickening agent, and this has led to problems of further flavor impairment or cost increase. Depending on the formulation, even addition of an emulsifier or thickening agent fails to provide a sufficient anti-precipitation effect in many cases.

Japanese Unexamined Patent Publication HEI No. 7-184546 discloses a process for producing a stable coffee beverage which is characterized by subjecting a coffee extract to both treatment with mannanase and addition of alkali sodium or potassium salts, and particularly sodium bicarbonate.

Also, Japanese Unexamined Patent Publication HEI No. 8-228686 discloses a method of preventing precipitation of milk-added canned coffee which is characterized by adding a mixed emulsifier comprising a combination of emulsifiers each with a different HLB (hydrophilic-lipophilic balance).

In addition, Japanese Unexamined Patent Publication HEI No. 11-313647 discloses a method of preventing precipitation of milk-added canned coffee which is characterized by alkali-treating roasted coffee beans before extraction.

These methods all have their respective features, but an even simpler, more economical method has been desired.

SUMMARY OF THE INVENTION

It is therefore an object of the present invention to provide an economical method for preventing precipitation in milk-added coffee beverages during admixture of the milk and after heat sterilization.

It is another object of the invention to provide a rich-flavored milk-added coffee beverage wherein precipitation during admixture of milk component and after heat sterilization is prevented.

It is yet another object of the invention to provide a milk-added coffee beverage which is prepared by a process for production of milk-added coffee beverages involving heat sterilization after admixture of the milk component, wherein a strongly basic substance and/or a basic amino acid is added before admixture of the milk component, in order to prevent precipitation during admixture of the milk and after the heat sterilization, and to reduce the amount of emulsifier or thickening agent added which has been a cause of reduced flavor, as well as a process for its production.

The invention may be applied with particular advantages in products having a high content of coffee and milk components, to prevent precipitation after heat sterilization without increasing the amount of added emulsifier or thickening agent.

DETAILED DESCRIPTION OF THE INVENTION

Figure 1:
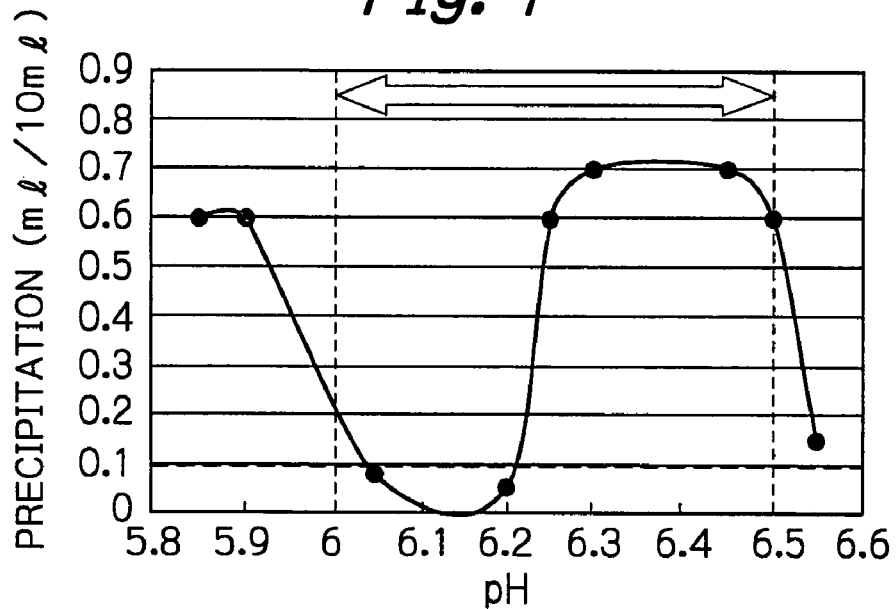
FIG. 1 is a graph showing the relationship between the amount of sodium bicarbonate added (pH) and the degree of precipitation after heat sterilization, for an emulsifier-free canned milk-added coffee beverage.

As a result of extensive research into the cause of precipitation in milk-added coffee beverages after heat sterilization, for the purpose of solving the problems described above, the present inventors found, surprisingly, that sodium bicarbonate that has conventionally been used for pH adjustment to prevent coagulation during the milk-mixing step is the major cause of precipitation during the heat sterilization step. Upon examining the mechanism of precipitation due to sodium bicarbonate, it was determined that precipitation of coffee and milk occurs because of a salting-out reaction due to sodium bicarbonate.

The present inventors then tried replacing all or a portion of the sodium bicarbonate with strongly basic substances and/or basic amino acids, and completed the present invention upon determining that this can prevent coagulation during admixture of milk component and prevent precipitation after heat sterilization.

When using a strongly basic substance or a basic amino acid in a milk-added coffee beverage according to the invention, there is no adverse effect on the color, odor or taste, similar to sodium bicarbonate. In fact, it is possible to reduce or eliminate the addition of emulsifier or thickening agent, which has been a cause of impaired flavor, and thereby produce a milk-added coffee beverage with a more satisfactory flavor than conventional coffee beverages. A particularly notable difference in flavor over the prior art method is achieved when substantially no sweetener component is added, so that a beverage exhibiting the original satisfactory flavor of milk-added coffee beverages may be obtained together with an anti-precipitation effect.

The present invention will now be explained in detail.

According to the present invention, "milk-added coffee beverage" refers to a beverage product prepared using coffee and milk components as the main raw materials, through a step of heat sterilization. The type of product is not particularly restricted, but mainly intended are "coffee", "coffee beverages" and "coffee-added soft drinks" as defined by the "Fair Competition Guidelines on Labeling of Coffee and Other Beverages" established in 1977. Beverages prepared from coffee as the raw material and having a milk solid content of at least 3.0% by weight fall under the "Fair Competition Guidelines on Labeling of Drinking Milk" and are treated as "milk beverages", but for the purpose of the present invention these will also be included as milk-containing coffee beverages.

"Coffee component" refers to a solution containing coffee bean-derived components, of which there may be mentioned primarily coffee extracts, i.e., solutions obtained by extraction of roasted and ground coffee beans using cold or hot water. There may also be mentioned, as coffee component, coffee solutions prepared from concentrated coffee extract, soluble coffee obtained by drying coffee extract, or the like, with suitable amounts of cold or hot water.

The cultivated species of coffee bean used as the raw material is not particularly restricted, and there may be mentioned species such as Arabica, Robusta, Liberica and the like, while the variety is also not particularly restricted, and there may be mentioned Mocha, Brazil, Colombian, Guatemala, Blue Mountain, Kona, Mandelin, Kilimanjaro and the like.

There are no particular restrictions on the degree of roasting (represented by the 3 basic levels of light roasted, medium roasted and dark roasted, in that order), and raw coffee beans may also be used. Coffee beans of two or more varieties may also be used in a blend.

There are also no particular restrictions on the degree of grinding of the roasted coffee beans (classified into coarse grinding, medium grinding, fine grinding, etc.), and ground coffee of different particle size distributions may be used, while the extraction may be carried out with any of various types of extractors (drip type, siphon type, boiling type, jet type, continuous type, etc.) using cold water, hot water or the like. A higher extraction temperature for the roasted coffee beans and a higher degree of extraction of the coffee component will tend to promote precipitation after heat sterilization, but there are no particular restrictions on the temperature conditions or degree of extraction.

The content of coffee component in the milk-added coffee beverage is not particularly restricted, but is preferably 0.1-10 wt % in terms of solid portion. Here, "solid portion" refers to the weight of the dry material obtained after drying the coffee component by a common drying method (lyophilization, evaporation to dryness, etc.) to remove the moisture.

In the present invention, "milk component" refers to a component added to a coffee beverage in order to impart milk flavor or milk texture, and includes primarily any milk, cow milk or dairy products. As examples there may be mentioned raw milk, cow milk, special cow milk, partially defatted milk, skim milk, processed milk, milk beverages and the like, and as dairy products there may be mentioned cream, concentrated whey, concentrated milk, concentrated skim milk, sugar-free condensed milk, sweetened condensed skim milk, total milk powder, skim milk powder, cream powder, whey powder, buttermilk powder, modified dry milk and the like. Cow milk is preferably used from the standpoint of flavor. Fermented milk or lactic acid bacteria beverages may also be used in the form of powders.

The content of milk component in the milk-added coffee beverage is not particularly restricted, but is preferably 0.1-10 wt % in terms of solid portion. Here, "solid portion" refers to the weight of the dry material obtained after drying the milk component by a common drying method (lyophilization, evaporation to dryness, etc.) to remove the moisture.

In the present invention, a "strongly basic substance" is a substance such as a base or salt that is alkaline with a degree of electrolytic dissociation ($\alpha$) of nearly 1 when dissolved in water. A value of $\alpha > 0.9$ is preferred. The degree of electrolytic dissociation ($\alpha$) is the proportion of the amount (moles, number of molecules) of ionized solute, where $\alpha=1$ denotes complete ionization, or 100% ionization. As strongly basic substances there may be mentioned sodium hydroxide, sodium hydroxide solution, potassium hydroxide, potassium hydroxide solution, trisodium phosphate, tripotassium phosphate and the like.

The amount of strongly basic substance to be added is not particularly restricted, but is preferably 0.005-0.5 wt % in consideration of the effect and cost. However, it is preferably added in an amount such that the pH of the milk-added coffee beverage does not rise above approximately 8.0 after its addition.

Of the strongly basic substances according to the invention, sodium hydroxide, (including sodium hydroxide solution), potassium hydroxide (including potassium hydroxide solution), trisodium phosphate and tripotassium phosphate are all food additives and are suitable for use from the standpoint of safety. These are available as commercial products in either solid or aqueous solution form. The purity is not particularly limited so long as it is of a degree suitable for consumption, and for example, the crystal sodium hydroxide purity may be 70.0-75.0%, the sodium hydroxide anhydrate purity may be 95.0% or greater and the potassium hydroxide purity may be 85.0% or greater. The crystallized form may be powdered, granular, globular, flaky, rod-shaped, etc. and is not particularly restricted.

In the invention, a "basic amino acid" is an amino acid that exhibits basicity in aqueous solution, and there may be mentioned lysine (Lys), arginine (Arg) and histidine (His). Salts, such as alkali metal salts or alkaline earth metal salts, or derivatives thereof which are basic and suitable for consumption, are also included in the basic amino acids of the invention.

The amount of the basic amino acid to be added is not particularly restricted, but is preferably 0.01-1 wt % in consideration of effect and cost. Here it is also limited to an amount such that the pH of the milk-added coffee beverage does not rise above approximately 8.0 after addition.

Of the basic amino acids of the invention, lysine (L-lysine), arginine (L-arginine) and histidine (L-histidine) are all food additives and are suitable for use from the standpoint of safety. These are available as commercial products in either solid or aqueous solution form, and their purity is not particularly restricted.

The strongly basic substance and/or basic amino acid of the invention may be added at appropriate amounts in various combinations within a range that does not impair the anti-precipitation effect or flavor.

The strongly basic substance or basic amino acid is preferably added in a step after extraction of the coffee, i.e., before admixture of the milk component, but it may instead be pre-added to the cold or hot water used for the coffee extraction step.

The pH of the milk-added coffee beverage product is not particularly restricted, but in consideration of the object of the invention and the flavor of the beverage, the pH is preferably 5.8-7.0 for the product after heat sterilization.

According to the invention, by using a strongly basic substance and/or basic amino acid instead of sodium bicarbonate it is possible to reduce the amount of addition of emulsifier or thickening agent, which is a cause of impaired flavor of milk-added coffee beverages. An "emulsifier" in the present invention is any additive with an emulsifying effect, which is a surfactant in the wide sense. As examples there may be mentioned sucrose fatty acid esters, sorbitan fatty acid esters, polyglycerin fatty acid esters and the like. A "thickening agent" is any additive with a thickening, gelling or stabilizing function, and there may be mentioned thickeners such as xanthan gum, gelling agents such as carrageenan, and stabilizers. In other words, emulsifiers and/or thickening agents include all those commonly used to prevent precipitation that occurs primarily during the heat sterilization step during production of milk-added coffee beverages and in the subsequent distribution, storage and vending machine warming.

Although an emulsifier or thickening agent is preferably used in the beverage of the invention in order to supplement the anti-precipitation effect, it is important for an amount added to be restricted to a range that does not notably impair flavor; and any emulsifiers and thickening agents are preferably added in a total amount of no greater than 1 wt %. For example, sucrose fatty acid esters are often also used to prevent proliferation of heat-resistant bacteria, and they may be added in a range that does not notably impair flavor. An emulsifier or thickening agent may be added at any point with no particular restrictions, so long as it is added no later than immediately following the start of the heat sterilization.

Sodium bicarbonate may be added to the beverage of the invention in order to complement the anti-precipitation effect during admixture of the milk component, but it is important for it to be in a range that does not promote precipitation after heat sterilization, and the amount is preferably no greater than 0.14 wt %.

A "sweet component" according to the invention is any component that exhibits sweetness. As examples, there may be mentioned sucrose, isomerized glucose, glucose, fructose, lactose, maltose, xylose, isomerized lactose, fructooligosaccharide, maltooligosaccharide, isomaltooligosaccharide, galactooligosaccharide, coupling sugar, paratinose, maltitol, sorbitol, erythritol, xylitol, lactitol, palatinit, reduced thickening agent sugar, stevia, glycyrrhizin, thaumatin, monellin, aspartame, alitame, saccharin, acesulfame K, sucralose, dulcin, and the like.

The presence, amount of addition and the point of addition of the sweet component may be appropriately adjusted according to the designed product, and are not particularly restricted. For an enhancement of flavor, it is a preferred mode of the invention to either add no sweet component or substantially no sweet component or to only lightly sweeten the product, since this will allow the tongue to sense the original flavor of the coffee with no influence of sweetening.

Other components may also be added, as appropriate, to impart to the beverage of the invention the necessary or preferred properties as a milk-added coffee beverage. As other components there may be mentioned antioxidants, (sodium erythorbate, etc.), aromatics (coffee flavorings, milk flavorings, etc.) and water (ion-exchange water, purified water, natural water, etc.).

According to the invention, the heat sterilization method may involve retort sterilization, a hot pack, sterile packing or the like and is not particularly restricted; while the sterilization conditions may be appropriately determined depending on the properties of the contents, the container, etc.

There are no particular restrictions on the shape of the container for the milk-added coffee beverage, and it may be canned, PET bottled, glass bottled, cardboard packed, etc.

EXAMPLES

The invention will now be explained in greater detail by way of examples, with the understanding that the invention is in no way restricted to the examples.

Reference Example

The relationship between the amount of sodium bicarbonate addition and the degree of precipitation after heat sterilization was examined under conditions with no emulsifier or thickening agent addition.

Sodium bicarbonate was added in different amounts to a coffee extract (pH: approximately 5.0) obtained by extraction of 12 g of roasted coffee beans with purified water at 90° C., and then 12 g of sugar and 16 ml of cow milk were added to obtain test solutions which were each adjusted to a total of 200 ml with purified water.

The amount of sodium bicarbonate addition was determined in the following manner. For this test it was necessary to avoid precipitation during addition of the cow milk (pH: approximately 6.6). Considering the isoelectric point of casein which constitutes half of the protein in cow milk (near a pH of approximately 4.6), the addition of sodium bicarbonate was set to the minimum giving a pH of 6.0 or greater before the cow milk addition for all of the test solutions (a final concentration of 0.33 g/L). Also, considering the pH range in which most milk-added coffee beverage products are distributed (a pH range of approximately 6.0-6.5, see arrow in FIG. 1), the amounts of sodium bicarbonate were set to final concentrations of 0.33, 0.50, 0.67, 0.83, 1.00, 1.17, 1.33, 1.67 and 2.00 g/L.

The obtained test solutions were filled into 190 g cans and subjected to heat sterilization (125° C., 20 minutes) to obtain canned milk-added coffee beverages without addition of emulsifier.

The degree of precipitation of each of the canned milk-added coffee beverages was then measured by the following method. Specifically, the canned milk-added coffee beverage was allowed to stand at room temperature for 3 hours and agitated, after which 10 ml thereof was sampled and dispensed into a graduated centrifugation tube and centrifuged at 3000 rpm for 10 minutes, and the volume of the precipitate was measured.

The results of the experiment are shown in FIG. 1. The horizontal axis represents the pH values of the (sterilized) canned milk-added coffee beverages after addition of sodium bicarbonate at different concentrations (with a larger amount of sodium bicarbonate addition resulting in a higher pH).

As can be clearly seen from FIG. 1, under the pH conditions of this test which included the pH range in which most coffee beverage products are distributed (a pH range of approximately 6.0-6.5, or in terms of addition of sodium bicarbonate, approximately 0.67-1.67 g/L; see arrow in FIG. 1), a strict correlation was found between the pH after heat sterilization (i.e. the amount of sodium bicarbonate addition) and the degree of precipitation after heat sterilization. The degree of precipitation reached an acceptable level of under 0.1 ml/10 ml, depending on the amount of sodium bicarbonate addition (see pH range of approximately 6.0-6.2 in FIG. 1).

However, considering the fact that chemical changes during storage cause slight variation in the pH of milk-added coffee beverages, and the need to adapt to various product designs based on flavor, shelf life, etc., a technique is required that can prevent precipitation under any pH condition in the pH range of approximately 6.0-6.5 as the end product. The results of this test demonstrated that addition of sodium bicarbonate alone, under conditions where no emulsifier or thickening agent is added, can only be successfully applied in the limited pH range mentioned above.

Example 1

The use of sodium bicarbonate with different pH adjustors was examined. Sodium bicarbonate was added to coffee extract in a fixed amount, using the amount which produced the least precipitation in the experiment of the Reference Example (final concentration: 0.83 g/L, product pH: 6.2) (for a pH of 6.5 at this stage), and then different pH adjustors were added in amounts giving the same pH (pH 6.8). The procedure thereafter was carried out according to the Reference Example to obtain canned milk-added coffee beverages.

Strongly basic substances (sodium hydroxide, potassium hydroxide) and weakly basic substances (disodium hydrogen phosphate, dipotassium hydrogen phosphate, sodium bicarbonate (positive control)) were used as the pH adjustors. Separately, a solution was prepared with purified water added instead of a pH adjustor, as a negative control. The degree of precipitation in each of the canned milk-added coffee beverages was measured using the same method as in the Reference Example.

Figure 2:
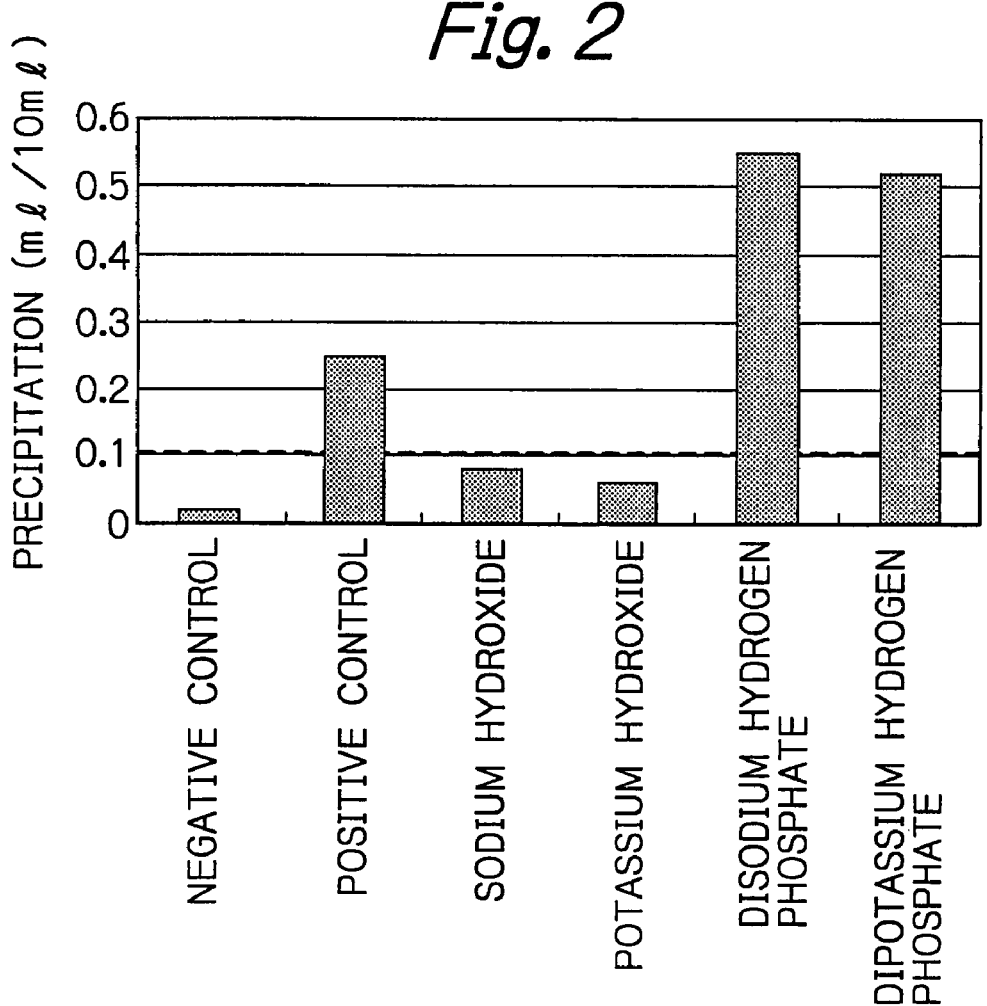
FIG. 2 is a bar graph showing the degree of precipitation after heat sterilization with addition of both sodium bicarbonate and different pH adjusters in emulsifier-free canned milk-added coffee beverages.

The results of this experiment are shown in FIG. 2. The pH values of the canned milk-added coffee beverages fell after heat sterilization. For example, the test product to which sodium bicarbonate was added in the amount (0.83 g/L) which gave the lowest degree of precipitation had a pH of 6.2 (see FIG. 1), but its pH was 6.5 before heat sterilization. This was thought to be due to a chemical change in the components by heating, and it is a phenomenon often seen upon heat sterilization of beverages.

As can be clearly seen from FIG. 2, the degree of precipitation changed significantly depending on the type of pH adjustor. Specifically, when a strongly basic substance (sodium hydroxide or potassium hydroxide) was added, the degree of precipitation was about as low as the negative control (purified water). On the other hand, when a weakly basic substance (disodium hydrogen phosphate, dipotassium hydrogen phosphate or sodium bicarbonate (positive control)) was added, the degree of precipitation was greater than when a strongly basic substance was added.

It was thus demonstrated that to control precipitation of milk-added coffee beverages during heat sterilization, it is effective to replace a portion of the sodium bicarbonate used as a pH adjustor with a different pH adjustor, and particularly that the use of a strongly basic substance such as sodium hydroxide or potassium hydroxide is important.

Example 2

Based on the knowledge obtained from Example 1, all of the sodium bicarbonate was replaced with a strongly basic substance (sodium hydroxide in this case). In the same manner as the Reference Example, the sodium hydroxide concentration was added in different amounts to obtain canned milk-added coffee beverages with no emulsifier added. The results of the experiment are shown in FIG. 3.

Figure 3:
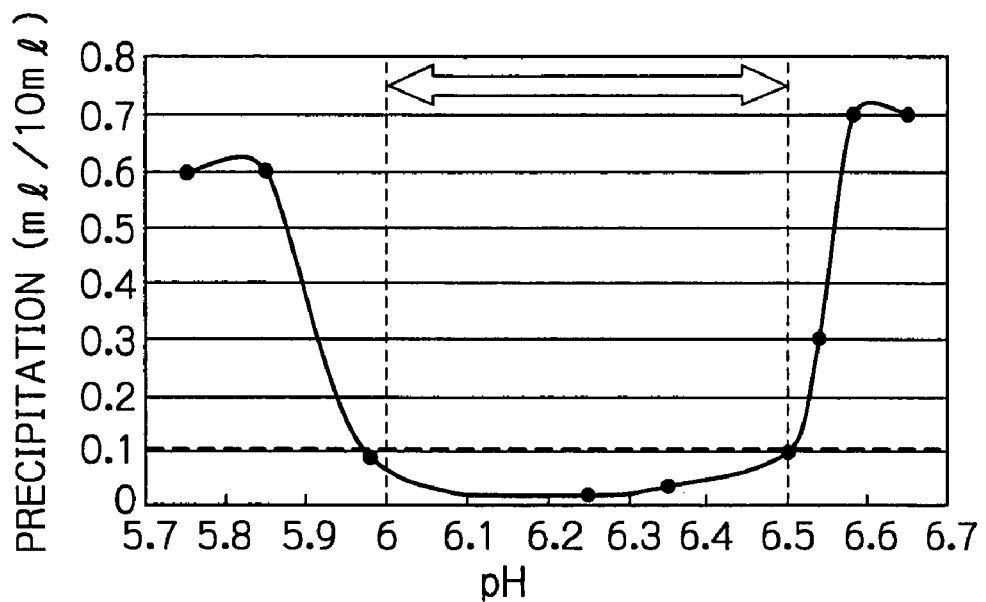
FIG. 3 is a graph showing the relationship between the amount of strongly basic substance added (pH) and the degree of precipitation after heat sterilization, for an emulsifier-free canned milk-added coffee beverage.

As can be clearly seen from FIG. 3, when all of the sodium bicarbonate was replaced with a strongly basic substance, a notable effect of preventing precipitation was found in the pH range in which common milk-added coffee beverage products are distributed (a pH range of approximately 6.0-6.5, see arrow in FIG. 3).

It was thus demonstrated that to control precipitation of milk-added coffee beverages during heat sterilization, it is effective to use a strongly basic substance alone as the pH adjustor. It was also demonstrated that using a strongly basic substance as the pH adjustor can prevent precipitation during heat sterilization under any pH condition in the pH range of approximately 6.0-6.5 as the end product.

Example 3

A test sample of a milk-added coffee beverage (emulsifier-free) was prepared by mixing the raw materials in the prescribed amounts shown in Table 1, heat sterilizing and adding a strongly basic substance, and the degree of precipitation and flavor were evaluated (Test Product 1). Two control test samples of sodium bicarbonate-containing milk-added coffee beverages (Control Product 1-1: emulsifier-free product and Control Product 1-2: emulsifier-added product) were also prepared. An emulsifier (sucrose fatty acid ester) was added to Control Product 1-2 in the necessary amount as an anti-precipitation agent.

Table 2 shows the evaluation results for the degree of precipitation and the flavor. The degree of precipitation was measured according to the Reference Example. The flavor was evaluated as the average of score by five professional panelists. Scoring was on the following 5 levels: "Good"=5 points, "Fair"=4 points, "Ordinary"=3 points, "Somewhat poor"=2 points, "Poor"=1 point.

The results are shown in Table 2. The flavor evaluation score for Test Product 1 (sodium bicarbonate-added, emulsifier-free) was fair at 4.2, but the degree of precipitation was 0.70 ml/10 ml, which was considerably greater than the target value ($\leq 0.1$ ml/10 ml).

With Control Product 1-2 (sodium bicarbonate-added, emulsifier-added), the effect of adding the emulsifier reduced the degree of precipitation to 0.05 ml/10 ml which was an acceptable level (less than 0.1 ml/10 ml). However, the flavor evaluation score (3.0) was lower than that of the other two products (4.2-4.6), suggesting that addition of the emulsifier led to a reduction in flavor.

On the other hand, the degree of precipitation with Control Product 1 was at an acceptable level of 0.05 ml/10 ml (less than 0.1 ml/10 ml), while the flavor evaluation score of 4.6 was the highest evaluation among the three products. This indicates that precipitation was successfully inhibited without using an emulsifier that causes reduction in flavor.

Thus, by using the present invention which employs a strongly basic substance as the pH adjustor, it is possible to inhibit precipitation during heat sterilization and produce a milk-added coffee beverage with a satisfactory taste.

TABLE 1

|  | Control Product 1-1 | Control Product 1-2 | Test Product 1 |
|---|---|---|---|
| Coffee beans | 60 g | 60 g | 60 g |
| Sugar | 60 g | 60 g | 60 g |
| Sodium bicarbonate | 2.0 g | 2.0 g | 0 g |
| Sodium hydroxide | 0 g | 0 g | 0.4 g |
| Emulsifier | 0 g | 1.5 g | 0 g |
| Cow milk | 120 ml | 120 ml | 120 ml |
| Total (adjusted with water) | 1000 ml | 1000 ml | 1000 ml |

TABLE 2

|  | Control Product 1-1 | Control Product 1-2 | Test Product 1 |
|---|---|---|---|
| Degree of precipitation (ml/10 ml) | 0.70 | 0.05 | 0.05 |
| Average score of flavor evaluation | 4.2 | 3.0 | 4.6 |

Example 4

Next, basic amino acids were examined as additives expected to provide an anti-precipitation effect, in addition to the strongly basic substances which were confirmed to have a high anti-precipitation effect.

Emulsifier-free canned milk-added coffee beverages were obtained in the same manner as the Reference Example, but using only a basic amino acid (arginine or histidine) as the pH adjustor. As a control, a test sample of an emulsifier-free canned milk-added coffee beverage was obtained using only sodium bicarbonate as the pH adjustor. The results of the experiment are shown in FIG. 4.

Figure 4:
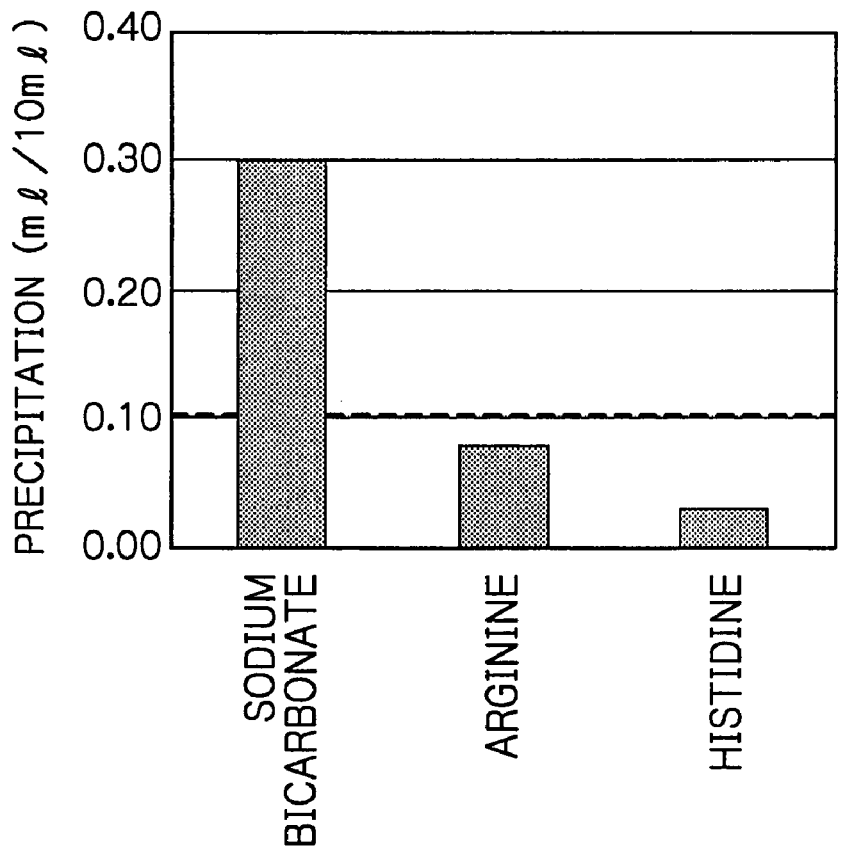
FIG. 4 is a bar graph showing the degree of precipitation after heat sterilization with addition of basic amino acids in emulsifier-free canned milk-added coffee beverages.

As can be clearly seen from FIG. 4, the degree of precipitation was an acceptable level ($\leqq 0.1$ ml/10 ml) when using either basic amino acid, and much lower than sample using sodium bicarbonate as the pH adjustor. The method of using a basic amino acid as the pH adjustor was thus demonstrated to be useful for inhibiting precipitation during heat sterilization of milk-added coffee beverages.

Example 5

Raw materials were combined in the prescribed amounts shown in Table 3 and heat sterilized, and then a strongly basic substance was added to prepare a milk-added coffee beverage (emulsifier-free) as a coffee- and cow milk-augmented type test product, and the degree of precipitation and flavor were evaluated. As a control, a coffee- and cow milk-augmented type test product was prepared by adding sodium bicarbonate to a milk-added coffee beverage (emulsifier-added). An emulsifier (sucrose fatty acid ester) was added thereto in the necessary amount as an anti-precipitation agent.

The degree of precipitation was measured according to the Reference Example, and the flavor evaluation was carried out according to Example 3. Table 4 shows the degrees of precipitation and the results of the flavor evaluation.

TABLE 3

|  | Control Product 2 | Test Product 2 |
|---|---|---|
| Coffee beans | 75 g | 75 g |
| Sugar | 60 g | 60 g |
| Sodium bicarbonate | 2.5 g | 0 g |
| Sodium hydroxide | 0 g | 0.5 g |
| Emulsifier | 3.0 g | 0 g |
| Cow milk | 150 ml | 150 ml |
| Total (adjusted with water) | 1000 ml | 1000 ml |

TABLE 4

|  | Control Product 2 | Test Product 2 |
|---|---|---|
| Degree of precipitation (ml/10 ml) | 0.07 | 0.06 |
| Average score of flavor evaluation | 2.8 | 4.6 |

As shown in Table 4, the degree of precipitation of Test Product 2 was at an acceptable level (s 0.1 ml/10 ml), equivalent to that of Control Product 2. However, the flavor evaluation of Test Product 2 was higher than that of the control product. It is presumed that with the high coffee and cow milk content in Control Product 2, the flavor evaluation was unsatisfactory because of the increase in emulsifier necessary to prevent precipitation after heat sterilization, whereas even with a high coffee and cow milk content in the Test Product 2, a satisfactory flavor evaluation was obtained because precipitation after heat sterilization was successfully prevented without addition of an emulsifier.

Example 6

A test sample of a milk-added coffee beverage (emulsifier-free) containing both a strongly basic substance and a basic amino acid was prepared by mixing the raw materials in the prescribed amounts shown in Table 5 and heat sterilizing.

As a result, the degree of precipitation of Test Product 3 was at an acceptable level ($\leqq 0.1$ ml/10 ml), and the flavor evaluation was satisfactory.

Thus, by using the present invention which employs a basic amino acid as the pH adjustor, it is possible to inhibit precipitation during heat sterilization and produce a milk-added coffee beverage with a satisfactory taste.

TABLE 5

|  | Test Product 3 |
|---|---|
| Coffee beans | 60 g |
| Sugar | 60 g |
| Sodium hydroxide | 0.2 g |
| Arginine | 0.6 g |
| Cow milk | 120 ml |
| Total (adjusted with water) | 1000 ml |

Example 7

The effect of the invention when adding no sweet components was evaluated.

A milk-added coffee beverage (emulsifier-free) containing no sweet component, using a strongly basic substance as the pH adjustor, was prepared as a test sample with the raw materials in the prescribed amounts shown in Table 6, and the degree of precipitation and flavor were evaluated. A test product of a milk-added coffee beverage (emulsifier-added) containing no sweet component and using sodium bicarbonate as the pH adjustor was also prepared as a control. An emulsifier (sucrose fatty acid ester) was added thereto in the necessary amount as an anti-precipitation agent.

The degree of precipitation was measured according to the Reference Example, and the flavor evaluation was carried out according to Example 3. Table 7 shows the degrees of precipitation and the results of the flavor evaluation.

TABLE 6

|  | Control Product 4 | Test Product 4 |
| --- | --- | --- |
| Coffee beans | 60 g | 60 g |
| Sodium bicarbonate | 2.0 g | 0 g |
| Sodium hydroxide | 0 g | 0.4 g |
| Emulsifier | 2.5 g | 0 g |
| Cow milk | 120 ml | 120 ml |
| Total (adjusted with water) | 1000 ml | 1000 ml |

TABLE 7

|  | Control Product 4 | Test Product 4 |
| --- | --- | --- |
| Degree of precipitation (ml/10 ml) | 0.06 | 0.05 |
| Average score of flavor evaluation | 2.3 | 4.8 |

As a result, the degree of precipitation of the test product and of the control product were both equivalent at an acceptable level ($\leqq 0.1$ ml/10 ml). However, the flavor evaluation of the test product was higher than that of the control product. The difference in the flavor evaluations of both products was greater than in the previous test (Example 3) in which sweetness was added. It is presumed that when no sweet component is added, the flavor can be judged without the influence of sweetness, allowing a more definite distinction between rich and poor flavor.

Thus, the present invention can be suitably used when the flavor is to judged without the influence of sweetness, such as in cases with substantially no addition of sweet components or with only light sweetening.

What is claimed is:

1. A heat-sterilized milk-added coffee beverage wherein said beverage is packaged in a sealed container, and contains a basic amino acid but does not contain sodium bicarbonate at an amount of more than 0.14 wt % of the beverage, and wherein the basic amino acid is at least one selected from the group consisting of lysine, arginine and histidine, and the pH of the milk-added coffee beverage product is 5.8-7.0.

2. A milk-added coffee beverage according to claim 1, wherein the basic amino acid is at least one selected from the group consisting of lysine and arginine.

3. A milk-added coffee beverage according to claim 1, wherein the amount of the basic amino acid in the beverage is 0.005-0.5 wt % of the beverage.

4. A milk-added coffee beverage according to claim 1, which contains a coffee component at 0.1-10 wt % of the beverage.

5. A milk-added coffee beverage according to claim 1, which contains a milk component at 0.1-10 wt % of the beverage.

6. A milk-added coffee beverage according to claim 5, wherein the milk component is cow's milk.

7. A milk-added coffee beverage according to claim 1, wherein the formation of precipitates during or after the heat sterilization have been suppressed by a method comprising adding the basic amino acid to a coffee component, mixing a milk component therewith and then heat sterilizing the mixture.

8. A milk-added coffee beverage according to claim 7, wherein the basic amino acid is added before mixing the milk component with the coffee component and subsequently the coffee component is admixed with the milk component before the beverage is subjected to heat sterilization.

9. A milk-added coffee beverage according to claim 7, wherein addition of the basic amino acid reduces the amount of emulsifier and/or thickening agent required.

10. A milk-added coffee beverage according to claim 9, wherein the total amount of emulsifier and thickening agent added is no greater than 1 wt % of the beverage.

11. A method of suppressing the formation of precipitates during or after the heat sterilization of a beverage in the process of producing a milk-added coffee beverage which contains a basic amino acid but does not contain sodium bicarbonate at an amount of more than 0.14 wt % of the beverage, and wherein the basic amino acid is at least one selected from the group consisting of lysine, arginine and histidine, and the pH of the milk-added coffee beverage product is 5.8-7.0, the method comprising (a) adding a basic amino acid to a coffee component to the beverage, (b) mixing a milk component therewith, and then (c) heat sterilizing the mixture.

12. A method according to claim 11, wherein the basic amino acid is added before mixing the milk component with the coffee component and subsequently the coffee component is admixed with the milk component before the beverage is subjected to heat sterilization.

13. A method according to claim 11, wherein addition of the basic amino acid reduces the amount of emulsifier and/or thickening agent required.

14. A method according to claim 13, wherein the total amount of emulsifier and thickening agent added is no greater than 1 wt % of the beverage.

15. A method according to claim 11, wherein the basic amino acid is at least one selected from the group consisting of lysine and arginine.

16. A method according to claim 11, wherein the amount of the basic amino acid added is 0.0-1 wt % of the beverage.

17. A method according to claim 12, wherein sodium bicarbonate is added in an amount of no more than 0.14 wt % of the beverage in addition to the basic amino acid.

18. A method according to claim 11, wherein the milk-added coffee beverage contains the coffee component at 0.1-10 wt % of the beverage.

19. A method according to claim 11, wherein the milk-added coffee beverage contains the milk component at 0.1-10 wt % of the beverage.

* * * * *